(12) United States Patent
Yang et al.

(10) Patent No.: US 12,445,660 B2
(45) Date of Patent: Oct. 14, 2025

(54) INTERACTION METHOD AND APPARATUS, ELECTRONIC DEVICE, AND STORAGE MEDIUM

(71) Applicant: Beijing Zitiao Network Technology Co., Ltd., Beijing (CN)

(72) Inventors: Can Yang, Beijing (CN); Wenjing Liu, Beijing (CN); Xinyue Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/587,244

(22) Filed: Feb. 26, 2024

(65) Prior Publication Data

US 2024/0251110 A1     Jul. 25, 2024

Related U.S. Application Data

(63) Continuation of application No. PCT/CN2022/109420, filed on Aug. 1, 2022.

(30) Foreign Application Priority Data

Aug. 26, 2021 (CN) .......................... 202110989388.2

(51) Int. Cl.
  *H04N 21/2187* (2011.01)
  *H04N 21/431* (2011.01)
(52) U.S. Cl.
  CPC ..... *H04N 21/2187* (2013.01); *H04N 21/4312* (2013.01)

(58) Field of Classification Search
  CPC ........... H04N 21/2187; H04N 21/4312; H04N 21/8549; H04N 21/4438; H04N 21/482;
  (Continued)

(56) References Cited

U.S. PATENT DOCUMENTS

| 2018/0034874 A1 | 2/2018 | Cornell |
| 2018/0192154 A1 | 7/2018 | Paul |

(Continued)

FOREIGN PATENT DOCUMENTS

| CN | 104486339 A | 4/2015 |
| CN | 109413483 A | 3/2019 |

(Continued)

OTHER PUBLICATIONS

International Search Report and Written Opinion of the International Searching Authority for PCT/CN2022/109420, mailed Oct. 20, 2022, 7 pages.

(Continued)

*Primary Examiner* — Alazar Tilahun
(74) *Attorney, Agent, or Firm* — Astute IP Law Group

(57) ABSTRACT

The present disclosure relates to an interaction method and apparatus, an electronic device, a storage medium, and a product. The method includes: displaying target guide information on a preview interface; and in response to a trigger for the preview interface, entering a live video interface, and displaying a material related to the target guide information in a highlighting manner on the live video interface.

20 Claims, 10 Drawing Sheets

(58) Field of Classification Search
CPC ........... H04N 21/4826; H04N 21/4316; H04N 21/431; H04N 21/42204; H04N 21/2387; H04N 21/4668
See application file for complete search history.

(56) References Cited

U.S. PATENT DOCUMENTS

| | | | | |
|---|---|---|---|---|
| 2018/0331985 | A1* | 11/2018 | Lai | G06Q 30/0207 |
| 2019/0163336 | A1* | 5/2019 | Yu | H04N 21/4314 |
| 2021/0127169 | A1* | 4/2021 | Stathacopoulos | H04N 21/4312 |
| 2022/0312078 | A1* | 9/2022 | Cui | H04N 21/4316 |
| 2023/0224545 | A1* | 7/2023 | Deng | H04L 65/611 |
| | | | | 725/93 |

FOREIGN PATENT DOCUMENTS

| | | |
|---|---|---|
| CN | 110225388 A | 9/2019 |
| CN | 111314730 A | 6/2020 |
| CN | 111327917 A | 6/2020 |
| CN | 305948077 S | 7/2020 |
| CN | 111629251 A | 9/2020 |
| CN | 111641840 A | 9/2020 |
| CN | 112351300 A | 2/2021 |
| CN | 112767100 A | 5/2021 |
| CN | 112988299 A | 6/2021 |
| CN | 113115066 A | 7/2021 |
| CN | 113163269 A | 7/2021 |
| CN | 110267059 A | 8/2021 |
| CN | 113225581 A | 8/2021 |
| CN | 113269585 A | 8/2021 |
| JP | 2003296239 A | 10/2003 |
| JP | 2008263411 A | 10/2008 |
| JP | 2014522527 A | 9/2014 |
| JP | 2020052270 A | 4/2020 |
| JP | 2020510940 A | 4/2020 |
| JP | 2021057686 A | 4/2021 |

OTHER PUBLICATIONS

Extended European Search Report for European Patent Application No. 22860183.7, mailed on Sep. 23, 2024, 9 pages.
Communication pursuant to Rules 70(2) and 70a(2) EPC for European Application No. 22860183.7, mailed on Oct. 11, 2024, 1 page.
First Office Action for Chinese Patent Application No. 202110989388.2, mailed on Feb. 24, 2025, 17 pages.
Notice of Reasons for Refusal for Japanese Patent Application No. 2023-579003, mailed on Dec. 10, 2024, 6 pages.
Office Action for Chinese Patent Application No. 202110989388.2, mailed on Aug. 11, 2025, 14 pages.

\* cited by examiner

INTERACTION METHOD AND APPARATUS, ELECTRONIC DEVICE, AND STORAGE MEDIUM

CROSS REFERENCE TO RELATED APPLICATION

This application is a continuation of International Patent Application No. PCT/CN2022/109420, filed on Aug. 1, 2022, which claims the priority to and benefits of Chinese patent application Ser. No. 202110989388.2, filed on Aug. 26, 2021. All the aforementioned patent applications are hereby incorporated by reference in their entireties.

TECHNICAL FIELD

The present disclosure relates to a field of computer communication technology, and more particularly, to an interaction method and apparatus, an electronic device, a storage medium, and a product.

BACKGROUND

When a user browses a short video through user device, the user may browse to a short video interface, and play the corresponding short video through the displayed short video interface; or the user may also browse to a preview stream interface, and enter a live video through the displayed preview stream interface, so as to watch the video content of the live video.

SUMMARY

In order to solve the above-described technical problems or at least partially solve the above-described technical problems, the present disclosure provides an interaction method and apparatus, an electronic device, a storage medium, and a product, which can enhance watching willingness of users.

In a first aspect, the present disclosure provides an interaction method, which comprises:

displaying target guide information on a preview stream interface; and in response to a trigger for the preview stream interface, entering a live video interface, and displaying a material related to the target guide information in a highlighting manner on the live video interface.

In a possible design, the preview stream interface alternately displays a plurality of pieces of guide information, and the target guide information is a piece of guide information displayed at a moment when the trigger occurs.

In a possible design, the target guide information is interacted through a target prop; and displaying the material related to the target guide information in the highlighting manner on the live video interface comprises:

displaying the target prop in the highlighting manner in a third preset region on the live video interface.

In a possible design, displaying the target prop in the highlighting manner in the third preset region on the live video interface comprises:

zooming in the target prop with an animatic effect in the third preset region on the live video interface.

In a possible design, displaying the material related to the target guide information in the highlighting manner on the live video interface comprises:

displaying a pop-up window on the live video interface, and displaying the material related to the target guide information within the pop-up window.

In a possible design, displaying the material related to the target guide information in the highlighting manner on the live video interface comprises:

displaying a panel in an overlaying manner on the live video interface, and displaying the material related to the target guide information on the panel.

In a possible design, the preview stream interface further displays a target icon corresponding to the target guide information.

In a second aspect, the present disclosure provides an interaction apparatus, which comprises:

a display module, configured to display target guide information on a preview stream interface; and a trigger module, configured to, in response to a trigger for the preview stream interface, enter a live video interface, and display a material related to the target guide information in a highlighting manner on the live video interface.

In a possible design, the preview stream interface alternately displays a plurality of pieces of guide information, and the target guide information is a piece of guide information displayed at a moment when the trigger occurs.

In a possible design, the target guide information is interacted through a target prop; and displaying the material related to the target guide information in the highlighting manner on the live video interface comprises:

displaying the target prop in the highlighting manner in a third preset region on the live video interface.

In a possible design, displaying the target prop in the highlighting manner in the third preset region on the live video interface comprises:

zooming in the target prop with an animatic effect in the third preset region on the live video interface.

In a possible design, displaying the material related to the target guide information in the highlighting manner on the live video interface comprises:

displaying a pop-up window on the live video interface, and displaying the material related to the target guide information within the pop-up window.

In a possible design, displaying the material related to the target guide information in the highlighting manner on the live video interface comprises:

displaying a panel in an overlaying manner on the live video interface, and displaying the material related to the target guide information on the panel.

In a possible design, the preview stream interface further displays a target icon corresponding to the target guide information.

In a third aspect, the present disclosure provides an electronic device, which comprises: one or more processors; and a memory. The memory stores program instructions. The one or more processors calls the program instructions in the memory to cause the electronic device to implement the interaction method according to any possible design in the first aspect and second aspect.

In a fourth aspect, the present disclosure provides a computer storage medium, which comprises computer instructions. The computer instructions, when running on an electronic device, cause the electronic device to execute the interaction method according to any possible design in the first aspect and second aspect.

In a fifth aspect, the present disclosure provides a computer program product. The computer program product, when running on a computer, causes the computer to execute the interaction method according to any possible design in the first aspect and second aspect.

BRIEF DESCRIPTION OF THE DRAWINGS

The accompany drawings herein are incorporated into and form part of the specification, which illustrate embodiments that comply with the present disclosure, and are used together with the specification to explain the principles of the present disclosure.

In order to clearly illustrate the technical solutions of the embodiments of the present disclosure or the existing technology, the drawings of the embodiments or the existing technology will be briefly described in the following. It is apparent that for those skilled in the art, other drawings can be obtained according to these drawings without creative labor.

DETAILED DESCRIPTION

Figure 1:
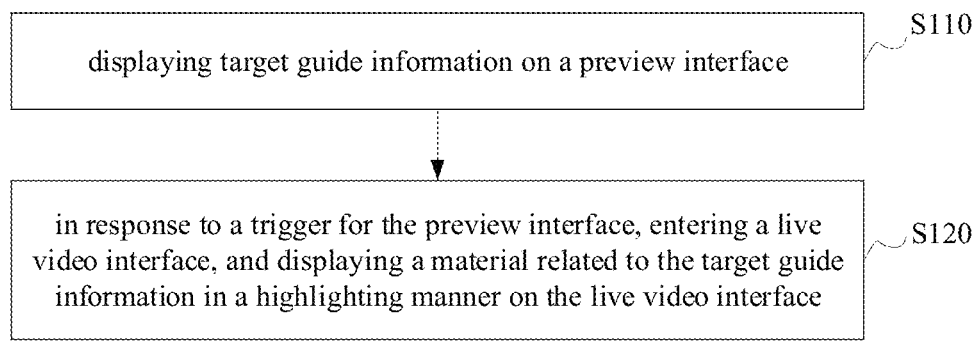
FIG. 1 is a schematic flow chart of an interaction method provided by the present disclosure.

In order to better understand the above objectives, features, and advantages of this disclosure, the following will further describe the schemes of the present disclosure. It should be noted that, without conflict, the embodiments disclosed herein and the features in the embodiments can be combined with each other.

Many specific details are elaborated in the following description to facilitate a full understanding of the present disclosure, but the present disclosure may be implemented in other ways different from those described herein. Obviously, the embodiments in the specification are only a part of the embodiments of the present disclosure, rather than the entire embodiments.

At present, when a user browses to a preview stream interface, guide information is displayed on the preview stream interface, and the content of the preview stream interface is "Click to enter the live video", so that the user can click to enter a corresponding interface to watch the live video. However, before entering the live video, the user is not aware of the content of the live video, and thus has no clear intention to enter the live video. After entering the live video, the interface of the live video is miscellaneous, which may lower the user's willingness to watch the live video.

The present disclosure provides an interaction method and an apparatus, an electronic device, a storage medium, and a product. Target guide information is displayed on a preview stream interface, to exhibit the target guide information of the live video to the user, so as to guide the user to enter the live video interface. In response to a trigger for the preview stream interface, the use can enter the live video interface from the preview stream interface, and a material related to the target guide information is displayed in a highlighting manner on the live video interface, so that the user may have a visual understanding of an intention to enter the live video room (also called as live video channel or live channel). Thus, the material related to the target guide information is exhibited to the user, which facilitates the user to execute a relevant operation and improves watching willingness of the user.

The interaction method of the present disclosure is executed by an electronic device or an application, a web page, an official account, etc. in the electronic device. The electronic device may be a device such as a tablet personal computer, a mobile phone, a wearable device, a vehicle-mounted device, an augmented reality (AR)/virtual reality (VR) device, a laptop, an ultra-mobile personal computer (UMPC), a netbook, a personal digital assistant (PDA), a smart TV, a smart screen, a high-definition TV, a 4K TV, a smart speaker, a smart projector, etc. The specific type of the electronic device is not limited in the present disclosure.

The type of the operating system of the electronic device is not limited in the present disclosure, which may be, for example, Android system, Linux system, Windows system, iOS system, etc.

Referring to FIG. 1, FIG. 1 is a schematic flow chart of an interaction method provided by an embodiment of the present disclosure. As illustrated in FIG. 1, the interaction method provided by the present disclosure may include:

S110: displaying target guide information on a preview interface.

A short video client application (APP) may be installed on the electronic device, and the APP can display a short video interface through a display interface of the electronic device. Some short video contents may be played on the short video interface for the user to browse.

In addition to displaying the short video interface, the display interface of the electronic device can also display a preview interface (also called as preview stream interface). The preview stream interface may be a preview interface corresponding to one live video.

The display interface of the preview stream interface may include target guide information. The target guide information is used to guide browsing of one live video, so that the user may intuitively understand an intention to enter the live video according to the target guide information, which enhances enthusiasm of the user for entering the live room.

It should be noted that the display mode of the target guide information on the preview stream interface may include various implementations.

In some embodiments, the display mode of the target guide information on the preview stream interface may include displaying in a middle region of the preview stream interface. For example, a specific display mode of the target guide information on the preview stream interface may be referred to the display mode of interface 11 exemplarily illustrated in FIG. 2A.

The interface 11 may include a region 1011.

The region 1011 is used to exhibit the target guide information. The target guide information is used to guide exhibiting an associated material of the live video, and the target guide information may be exhibited in a form of text or other characters in the region 1011. The specific text content of the target guide information is not limited in the embodiment. In some embodiments, the specific content of the target guide information can be referred to the text "Click on the live room to obtain resources" in the region 1011 exhibited on the interface 11 exemplarily illustrated in FIG. 2A.

The associated material of the live video may include various types, for example, "resource reward", "task reward", "task fabrication", etc. The resource may be a virtual reward in the live room or a physical reward distributed by users.

In some other embodiments, the display mode of the target guide information on the preview stream interface may include displaying in a top region of the preview stream interface.

In still other embodiments, the display mode of the target guide information on the preview stream interface may include displaying in a bottom region of the preview stream interface.

In still other embodiments, the display mode of the target guide information on the preview stream interface may include displaying in a left region of the preview stream interface.

In still other embodiments, the display mode of the target guide information on the preview stream interface may include displaying in a right region of the preview stream interface.

In addition, the display position of the target guide information on the preview stream interface may also be arranged in a region that the user may directly see, so as to facilitate the user to directly notice the target guide information when browsing to the preview stream interface.

It should be noted that the target guide information displayed on the preview stream interface may be a piece of pre-formulated guide information, for example, "Click to enter the live room to obtain resources", which may intuitively and clearly indicate the reward after clicking to enter the live room.

When the user browses to the preview stream interface, a piece of guide information may be selected as the target guide information for display on the preview stream interface, which is convenient for a live broadcast entry operation according to the displayed target guide information.

On this basis, the target guide information displayed on the preview stream interface may further be a plurality of pieces of pre-formulated guide information, for example, "Click to enter the live room", "Participate in live interaction to obtain resources", etc.

When the user browses to the preview stream interface, the plurality of pieces of guide information may be sequentially displayed on the preview stream interface, so as to guide the live video step by step.

In some embodiments, optionally, the preview stream interface may alternately display a plurality of pieces of guide information, and the target guide information is a piece of guide information displayed at a moment when a trigger occurs. The alternate display may include: dynamic alternate processes such as flipping replacement display, tiling replacement display, or the like.

Figure 2A:
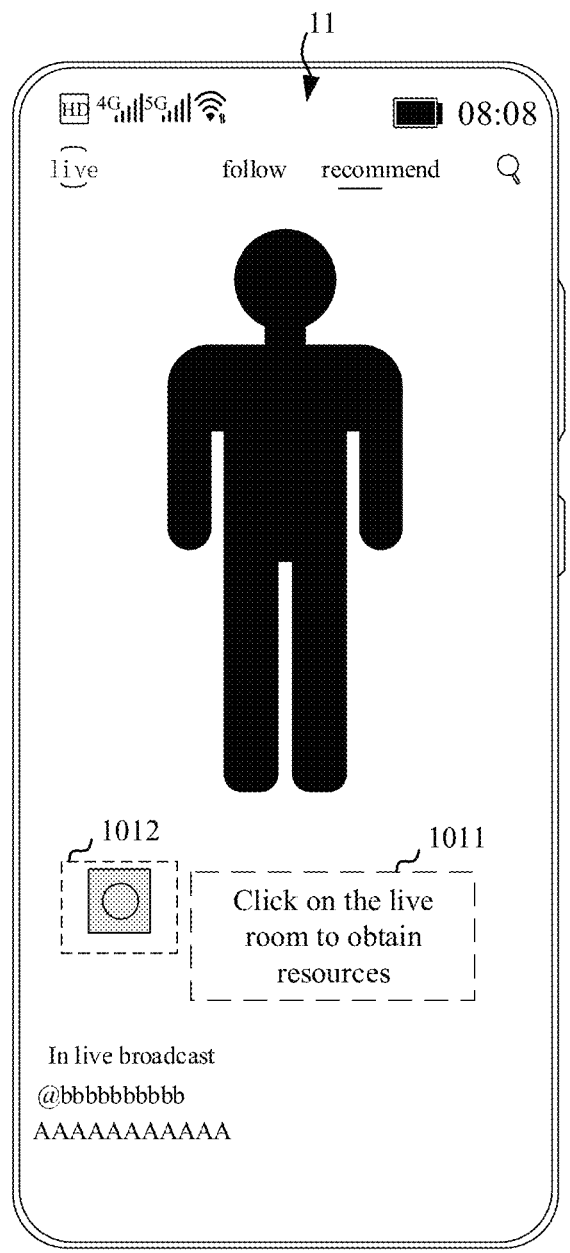
FIG. 2A to FIG. 2H are schematic diagrams of interaction interfaces provided by an embodiment of the present disclosure.
Figure 2B:
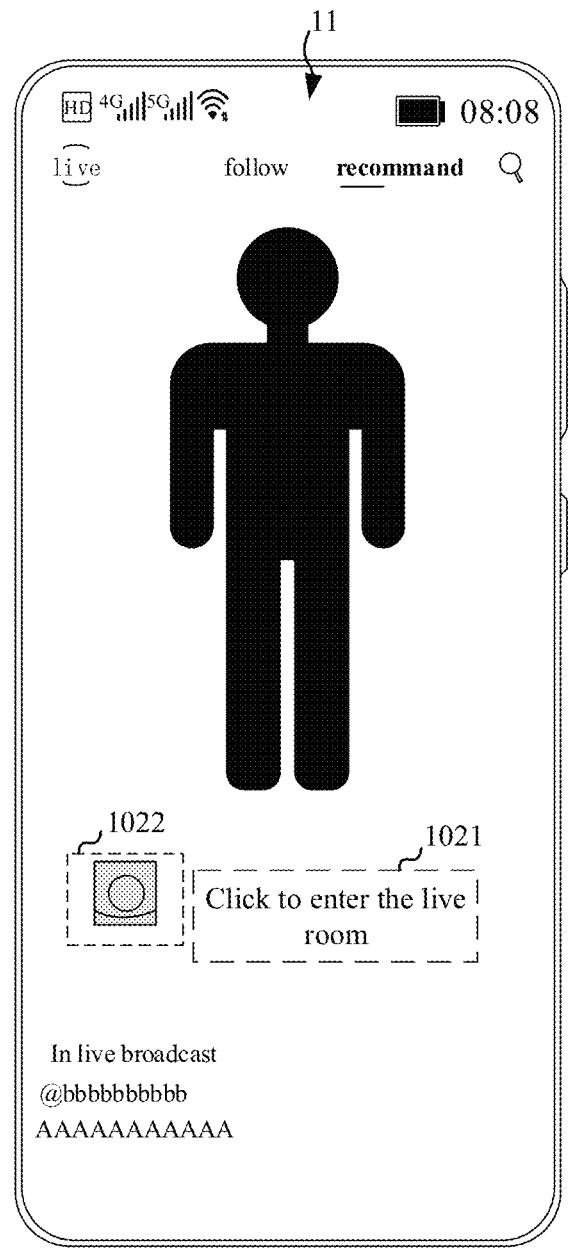
Figure 2C:
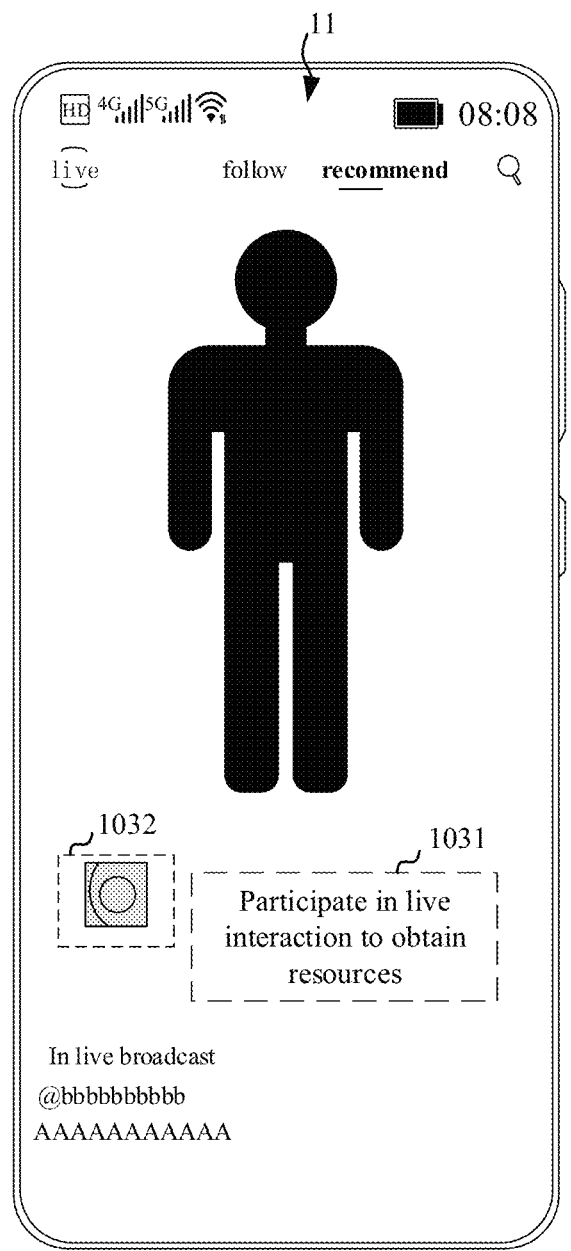

The display interface on which the preview stream interface alternately displays the plurality of pieces of guide information may be referred to the interface 11 exemplarily illustrated in FIG. 2B and the interface 11 exemplarily illustrated in FIG. 2C.

In FIG. 2B, the interface 11 may include a region 1021.

The region 1021 is used to exhibit the guide information. The guide information is used to guide exhibiting a certain associated material of the live video, and the guide information may be exhibited in a form of text or other characters in the region 1021. The specific text content of the guide information is not limited in the embodiment. In some embodiments, the specific content of the guide information may be referred to the text "Click on the live room" in the region 1021 exhibited on the interface 11 exemplarily illustrated in FIG. 2B.

With display of the guide information in the region 1021, the APP may alternately display other pieces of guide information on the preview stream interface as on the interface 11 exemplarily illustrated in FIG. 2C, that is, the currently displayed guide information is replaced with other guide information for exhibition, so as to facilitate the browsing user to notice the guide information displayed on the preview stream interface.

In FIG. 2C, the interface 11 may include a region 1031.

The region 1031 is used to exhibit the guide information. The guide information is used to guide exhibiting a certain associated material of the live video, and the guide information may be exhibited in a form of text or other characters in the region 1031. The specific text content of the guide information is not limited in the embodiment. In some embodiments, the specific content of the guide information may be referred to the text "Participate in live interaction to obtain resources" in the region 1031 exhibited on the interface 11 exemplarily illustrated in FIG. 2C.

It should be noted that when the preview stream interface alternately displays a plurality of pieces of guide information thereon, display regions of the plurality of pieces of guide information on the preview stream interface may be the same, or, when the preview stream interface alternately displays a plurality of pieces of guide information thereon, display regions of the plurality of pieces of guide information on the preview stream interface may be different.

For example, the position of the region 1021 exhibited on the interface 11 exemplarily illustrated in FIG. 2B and the position of the region 1031 exhibited on the interface 11 exemplarily illustrated in FIG. 2C may be the same, or, the position of the region 1021 exhibited on the interface 11 exemplarily illustrated in FIG. 2B and the position of the region 1031 exhibited on the interface 11 exemplarily illustrated in FIG. 2C may be different.

The guide information displayed in the region 1021 exhibited on the interface 11 exemplarily illustrated in FIG. 2B is regarded as first guide information, and the guide information displayed in the region 1031 exhibited on the interface 11 exemplarily illustrated in FIG. 2C is regarded as second guide information.

The specific display mode of the first guide information may include various implementations.

In some embodiments, the specific display mode of the first guide information may include displaying in a middle region on the interface 11 exemplarily illustrated in FIG. 2B.

In other embodiments, the specific display mode of the first guide information may include displaying in a top region on the interface 11 exemplarily illustrated in FIG. 2B.

In still other embodiments, the specific display mode of the first guide information may include displaying in a bottom region on the interface 11 exemplarily illustrated in FIG. 2B.

In still other embodiments, the specific display mode of the first guide information may include displaying in a left region on the interface 11 exemplarily illustrated in FIG. 2B.

In still other embodiments, the specific display mode of the first guide information may include displaying in a right region on the interface 11 exemplarily illustrated in FIG. 2B.

The specific display mode of the second guide information may include various implementations.

In some embodiments, the specific display mode of the second guide information may include displaying in a middle region on the interface 11 exemplarily illustrated in FIG. 2C.

In other embodiments, the specific display mode of the second guide information may include displaying in a top region on the interface 11 exemplarily illustrated in FIG. 2C.

In still other embodiments, the specific display mode of the second guide information may include displaying in a bottom region on the interface 11 exemplarily illustrated in FIG. 2C.

In still other embodiments, the specific display mode of the second guide information may include displaying in a left region on the interface 11 exemplarily illustrated in FIG. 2C.

In still other embodiments, the specific display mode of the second guide information may include displaying in a right region on the interface 11 exemplarily illustrated in FIG. 2C.

It should be noted that when the preview stream interface alternately displays a plurality of pieces of guide information thereon, there may be a logical connection between the plurality of pieces of guide information, so as to facilitate the user to understand accurate meaning of the guide information and enter the live room based on the guide information.

When the preview stream interface alternately displays a plurality of pieces of guide information thereon, the target guide information is a piece of guide information displayed at a moment when a trigger occurs. That is, the target guide information corresponding to different trigger occurrence moments may be different.

The trigger occurrence moment is a moment when a trigger operation of the user on the preview stream interface occurs.

Specifically, the specific implementations of the trigger operation may include various implementations as follows.

In some embodiments, the trigger operation may be a trigger operation of a user on the display region of the target guide information on the preview stream interface, for example, a trigger operation on the region 1011 on the interface 11 exemplarily illustrated in FIG. 2A, or a trigger operation on the region 1021 on the interface 11 exemplarily illustrated in FIG. 2B, or a trigger operation on the region 1031 on the interface 11 exemplarily illustrated in FIG. 2C.

In some embodiments, the trigger operation may be a trigger operation of the user on any display region among display regions of non-target-guide information on the preview stream interface, for example, a trigger operation on other region except the region 1011 on the interface 11 exemplarily illustrated in FIG. 2A, or, a trigger operation on other region except the region 1021 on the interface 11 exemplarily illustrated in FIG. 2B, or, a trigger operation on other region except the region 1031 on the interface 11 exemplarily illustrated in FIG. 2C, which, thus, facilitate the user to directly trigger entering the live room for browsing, without specifically clicking on the target guide information.

The trigger operation may include: click, double click, slide, etc.

In addition, the target guide information displayed on the preview stream interface may be dynamically configured through the live video displayed in the APP. For example, if resource rewards may be received after entering the live video, the target guide information may be exhibited on the preview stream interface referring to the region 1011 exemplarily illustrated in FIG. 2A.

Alternatively, the target guide information displayed on the preview stream interface may be dynamically configured according to time information. For example, if the current day is weekend time, then the target guide information may be exhibited on the preview stream interface referring to the region 1041 exemplarily illustrated in FIG. 2D.

Thus, the target guide information exhibited to the user by the APP on the preview stream interface may better match current environment of the user and improve willingness of the user to enter the live room.

Correspondingly, when the preview stream interface alternately displays a plurality of pieces of guide information thereon, the plurality of pieces of guide information may also support dynamic configuration.

Based on description of the above-described embodiments, in addition to displaying the target guide information on the preview stream interface, information related to the target guide information may also be displayed on the preview stream interface.

In some embodiments, optionally, the preview stream interface further displays a target icon corresponding to the target guide information.

The target guide information may correspond to one target icon, or, the target guide information may also correspond to a plurality of target icons, so that the target guide information is more vivid. The target icon is used to vividly describe the target guide information. The target icon is also called as a second element. For example, the target guide information includes the second element, and the second element may be an icon, such as an icon with a star shape.

Correspondingly, the display region of the target guide information may also correspond to a display region of the target icon. The display region of the target icon may include various implementations.

Figure 2D:
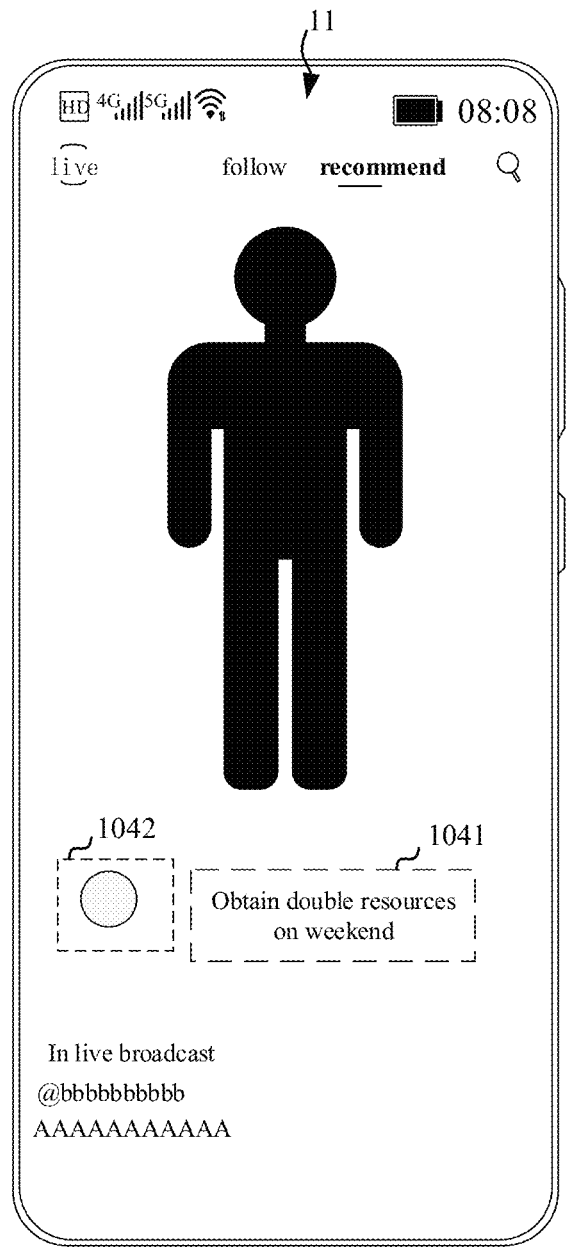

In some embodiments, the implementation of the display region of the target icon may include displaying in a region left to the target guide information, for example, the region 1012 left to region 1011 exemplarily illustrated in FIG. 2A, or the region 1022 left to the region 1021 exemplarily illustrated in FIG. 2B, or the region 1032 left to the region 1031 exemplarily illustrated in FIG. 2C, or the region 1042 left to the region 1041 exemplarily illustrated in FIG. 2D.

In other embodiments, the implementation of the display region of the target icon may include displaying in a region right to the target guide information.

In still other embodiments, the implementation of the display region of the target icon may include displaying in a region above the target guide information.

In still other embodiments, the implementation of the display region of the target icon may include displaying in a region below the target guide information.

It should be noted that the display mode of the target icon may include static display and dynamic display.

The static display of the target icon may be referred to display of the region 1012 exemplarily illustrated in FIG. 2A, or display of the region 1022 exemplarily illustrated in FIG. 2B, or display of the region 1032 exemplarily illustrated in FIG. 2C, or display of the region 1042 exemplarily illustrated in FIG. 2D.

The dynamic display mode of the target icon may include display with an animatic effect on the basis of static display. The display with the animatic effect is, for example, the icon zooming in and returning to an original state, the icon scrolling, the icon zooming out and returning to an original state, etc.

It should be noted that when the plurality of pieces of guide information is displayed alternately, the target icons corresponding to the plurality of pieces of guide information may also be displayed alternately. The plurality of pieces of guide information may correspond to a same target icon, or respective pieces of guide information may also correspond to different target icons.

Correspondingly, when different target icons are displayed alternately, specific implementations of alternate display thereof may include: display with replacement in a scrolling manner, display with replacement in a tiling manner, or other display modes with an animatic effect, which is not limited in the embodiment.

When the display mode of the target icon is dynamic display, and the preview stream interface alternately displays a plurality of pieces of guide information, the target icons may remain an original state when the plurality of pieces of guide information are alternately displayed, and then exhibited with an animatic effect when alternate display of the guide information ends.

In addition, in the case where the plurality of pieces of guide information correspond to a same target icon, when two pieces of guide information are displayed alternately, the same target icon corresponding thereto may also be displayed alternately with a same animatic effect, or the same target icon corresponding thereto may not be displayed alternately with a same animatic effect, that is, the display mode of the target icon is static display.

S120: in response to a trigger for the preview stream interface, entering the live video interface, and displaying a material related to the target guide information in a highlighting manner on the live video interface.

When receiving a trigger of the user for the preview stream interface, the APP switches from the preview stream interface to the live video interface, and the material related to the target guide information may be displayed in a highlighted manner on the live video interface.

The user may perform a trigger operation on the region where the target guide information displayed on the preview stream interface is located, so as to enter the live video interface, or the user may perform a trigger operation on any region outside the region where the target guide information displayed on the preview stream interface is located, so as to enter the live video interface.

After the preview stream interface displays the target guide information, as a trigger operation of the user for the preview stream interface is received, the preview stream interface may be switched to the live video interface, so that the live video interface displays the material related to the target guide information in a highlighting manner.

The material is determined and displayed corresponding to target guide information. For example, if target guide information is "Participate in live interaction to obtain resources", then the material corresponding thereto may be "resources to be obtained".

When the live video interface displays the material related to the target guide information in a highlighting manner, a plurality of display modes in a highlighting manner may be adopted.

In some embodiments, optionally, the target guide information is interaction through a target prop.

Displaying the material related to the target guide information in a highlighting manner on the live video interface may include: displaying the target prop in a highlighting manner in a third preset region (also called as transitory contact region) on the live video interface.

The target prop is a virtual prop corresponding to the target guide information, for example, the target prop may be a virtual prop corresponding to the target icon, or, the target prop may be a virtual prop corresponding to other icon.

Thus, it is convenient for the user to clearly observe the target prop corresponding to the target guide information after entering the video live room, so that the user may perform a trigger operation on the target prop, to acquire a reward corresponding to the target prop.

Figure 2E:
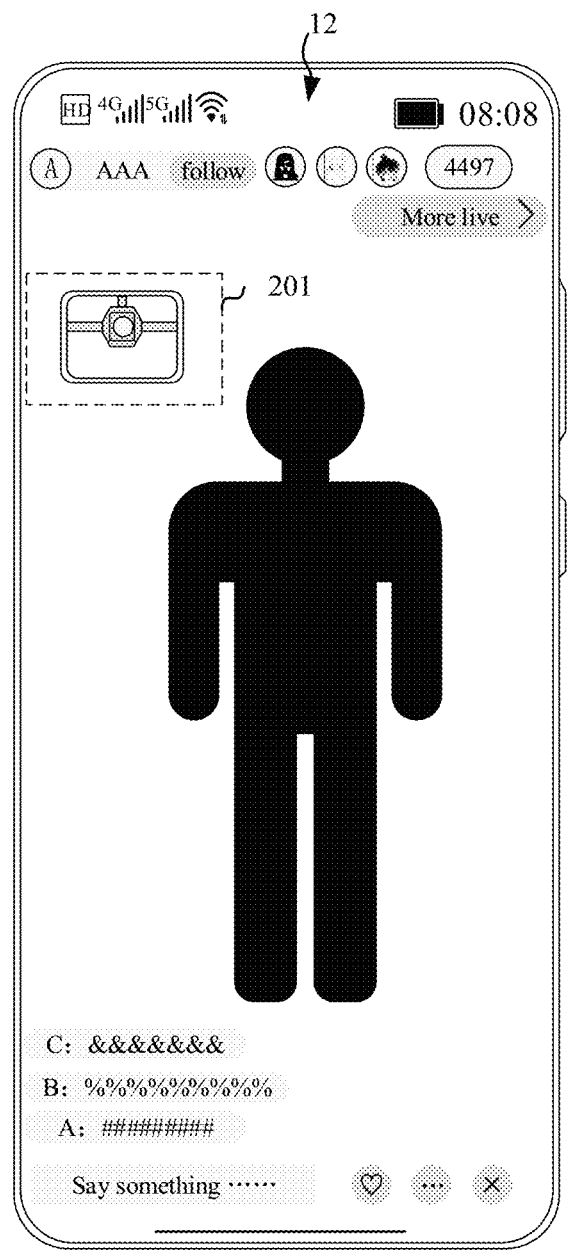

When the target guide information is interaction through the target prop, display of the target prop in a highlighting manner in the third preset region on the live video interface may be referred to the display on the interface 12 exemplarily illustrated in FIG. 2E.

In FIG. 2E, the interface 12 may include a region 201.

The region 201 corresponds to the third preset region, and is used to exhibit the target prop. The target prop may be used to display corresponding information in a region where the target prop is located after being triggered by the user. The target prop may be a first element, and for example, the first element is displayed in the region 201. The corresponding information may include: resource reward, task fabrication, etc. The specific display mode of the target prop is not limited in the embodiment. In some embodiments, the specific display mode of the target prop may be referred to the display in the region 201 exhibited on the interface 12 exemplarily illustrated in FIG. 2E. In some embodiments, for example, the first element is an icon, such as an icon with a star shape. For example, the display style of the first element and the display style of the second element may be identical or different. For example, the size of the first element and the size of the second element may be identical or different.

It should be noted that the display mode of the target prop in a highlighting manner may include dynamic display and static display.

The static display mode of the target prop is identification of the target prop in a highlighting manner, and statically display in a region where the target prop is located. The static display may include constant display and mobile display.

In an embodiment, the specific implementation of identification in a highlighting manner may include identification by zooming in the target prop, and constantly display in the region 201 exhibited on the interface 12 exemplarily illustrated in FIG. 2E, or mobile display in the region 201 and other region outside the region 201 on the interface 12 exemplarily illustrated in FIG. 2E.

In another embodiment, the specific implementation of identification in a highlighting manner may include identification of the target prop through a color darkening operation.

The dynamic display mode of the target prop is displaying the target prop with an animatic effect in a region where the target prop is located.

Figure 2F:
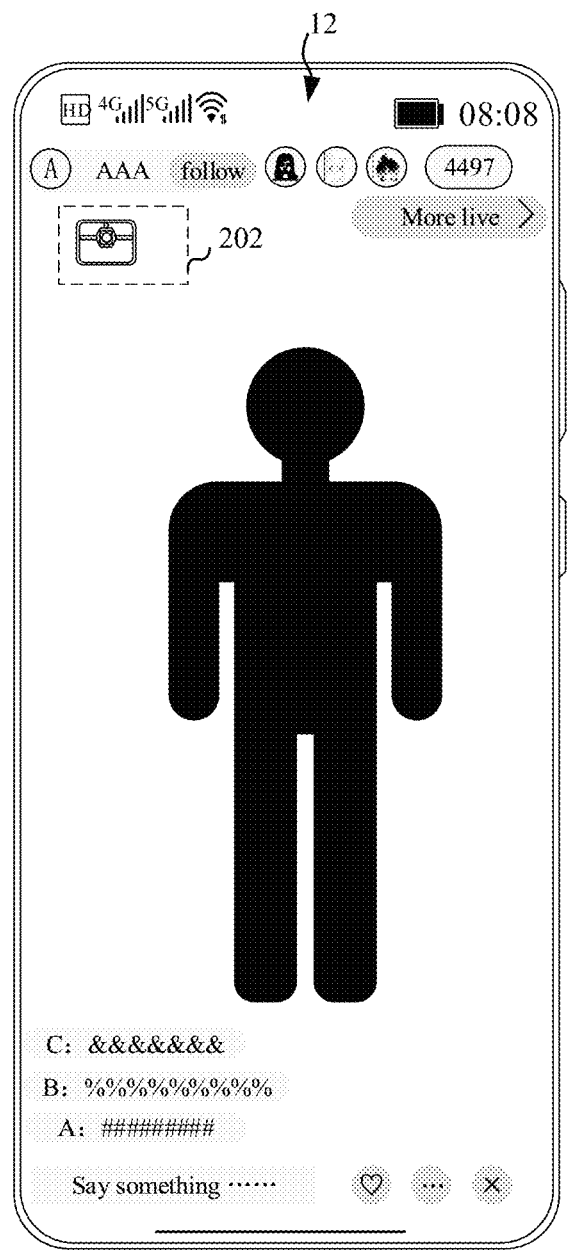

In an embodiment, the dynamic display mode of the target prop may include zooming in the target prop with an animatic effect in the third preset region on the live video interface. In the case of zooming in the target prop, the target prop zoomed in may be exhibited referring to the exhibition in the region 201 on the interface 12 exemplarily illustrated in FIG. 2E. In the case of first zooming in and then zooming out the target prop, the target prop zoomed out may be exhibited referring to the exhibition in the region 202 on the interface 12 exemplarily illustrated in FIG. 2F.

Operations of zooming in and zooming out the target prop may be sequentially switched in the region 201, so as to implement exhibition of the target prop with an animatic effect. Thus, effective identification of the target prop by the user may be improved.

In another embodiment, the dynamic display mode of the target prop may include displaying the target prop in a scrolling manner with an animatic effect in the third preset region on the live video interface.

In still another embodiment, the dynamic display mode of the target prop may include displaying the target prop in a tiling manner with an animatic effect in the third preset region on the live video interface.

In still another embodiment, the dynamic display mode of the target prop may include zooming in the target prop outside the third preset region and then gradually zooming out the target prop until moving to the third preset region and displaying an initial-state size of the target prop. Alternatively, the dynamic display mode of the target prop may include zooming out the target prop outside the third preset region and then gradually zooming in the target prop until moving to the third preset region and displaying an initial-state size of the target prop.

In still another embodiment, the dynamic display mode of the target prop may include displaying in a manner of scrolling the target prop from outside the third preset region to the third preset region.

In still another embodiment, the dynamic display mode of the target prop may include displaying in a manner of tiling the target prop from outside the third preset region to the third preset region.

In addition, after a trigger operation on the target prop is received, a target reward corresponding to the target prop may be displayed on the live video interface.

The target reward may be displayed on the live video interface. The specific display mode of the target reward may include static display and dynamic display.

In an embodiment, the display mode of the target reward may include statically displaying the target reward in a first preset region on the live video interface.

In another embodiment, the display mode of the target reward may include displaying the target reward in a dynamic scrolling manner in the first preset region on the live video interface, or the display mode of the target reward may include displaying the target reward in a dynamic tiling manner in the first preset region on the live video interface, or the display mode of the target reward may include displaying the target reward in a manner of dynamic zooming out and then zooming in in the first preset region on the live video interface, or the display mode of the target reward may include displaying the target reward in a manner of dynamic zooming in and then zooming out in the first preset region on the live video interface.

In still another embodiment, the display mode of the target reward may include displaying the target reward in a manner of dynamic scrolling from a second preset region to the first preset region on the live video interface, or the display mode of the target reward may include displaying the target reward in a manner of dynamic tiling from the second preset region to the first preset region on the live video interface, or the display mode of the target reward may include displaying the target reward in a manner of dynamic zooming out and then zooming in from the second preset region to the first preset region on the live video interface, or the display mode of the target reward may include displaying the target reward in a manner of dynamic zooming in and then zooming out from the second preset region to the first preset region on the live video interface.

The first preset region is one display region on the live video interface, and is used to display the target reward after the target prop is activated.

The second preset region is one display region on the live video interface which is different from the first preset region, and is used to perform transition on the target reward after the target prop is activated.

In other embodiments, optionally, displaying the material related to the target guide information in the highlighting manner on the live video interface may include: displaying a pop-up window on the live video interface, and displaying the material related to the target guide information within the pop-up window. For example, the pop-up window displays an interactive control corresponding to the target guide information. The target guide information indicates live interactive guidance information, and the live interactive guidance information is used to guide a user to enter a live video channel and participate in live video channel interaction to obtain a target resource. For example, the method further includes: in response to triggering of the interactive control, displaying an interactive interface; and in response to completing target interaction through the interactive interface, obtaining the target resource. For example, in response to the triggering of the interactive control, displaying the interactive interface, includes: in response to the triggering of the interactive control, displaying a gift interactive interface, wherein a plurality of gift identifications are displayed on the gift interactive interface; and in response to a gift sending operation corresponding to a target gift identification, sending a gift corresponding to the target gift identification to a host of the live video channel, wherein the target gift identification is one gift identification among the plurality of gift identifications.

The pop-up window may be displayed in a designated region of the live video interface, thereby displaying the material related to the target guide information in a manner of pop-up window, which facilitates the user to intuitively browse the material related to the target guide information.

It should be noted that the display mode of the pop-up window in the display region on the live video interface may include various implementations.

In an embodiment, the display mode of the pop-up window in the display region on the live video interface may include displaying in a middle region of the live video interface. For example, the display mode of the pop-up window in the display region on the live video interface may be referred to display on the interface 12 exemplarily illustrated in FIG. 2G.

The interface 12 may include a region 203.

The region 203 is used to exhibit the pop-up window. Exemplarily, the display mode of the pop-up window in the display region of the live video interface may be referred to display of the region 203 exhibited on the interface 12 exemplarily illustrated in FIG. 2G.

In another embodiment, the display mode of the pop-up window in the display region of the live video interface may include displaying in a top region of the live video interface.

In still another embodiment, the display mode of the pop-up window in the display region of the live video interface may include displaying in a bottom region of the live video interface.

In still another embodiment, the display mode of the pop-up window in the display region of the live video interface may include displaying in a left region of the live video interface.

In still another embodiment, the display mode of the pop-up window in the display region of the live video interface may include displaying in a right region of the live video interface.

In addition, the display region of the pop-up window in the live video interface may also be arranged in a region that user may visually see, so as to facilitate the user to directly notice the material related to the target guide information displayed within the pop-up window when entering the live video interface.

In still other embodiments, optionally, displaying the material related to the target guide information in the highlighting manner on the live video interface may include: displaying a panel in an overlaying manner on the live video interface, and displaying the material related to the target guide information on the panel. For example, the panel displays an interactive control corresponding to the target guide information. The target guide information indicates live interactive guidance information, and the live interactive guidance information is used to guide a user to enter a live video channel and participate in live video channel interaction to obtain a target resource. For example, the method further includes: in response to triggering of the interactive control, displaying an interactive interface; and in response to completing target interaction through the interactive interface, obtaining the target resource. For example, in response to the triggering of the interactive control, displaying the interactive interface, includes: in response to the triggering of the interactive control, displaying a gift interactive interface, wherein a plurality of gift identifications are displayed on the gift interactive interface; and in response to a gift sending operation corresponding to a target gift identification, sending a gift corresponding to the target gift identification to a host of the live video channel, wherein the target gift identification is one gift identification among the plurality of gift identifications.

The panel may be displayed in an overlaying manner in a designated region of the live video interface, thereby displaying the material related to the target guide information through the panel, which facilitates the user to intuitively browse the material related to the target guide information.

It should be noted that the display mode of the overlay region of the panel on the live video interface may include various implementations.

In an embodiment, the display mode of the overlay region of the panel on the live video interface may include displaying in a middle region of the live video interface. For example, the display mode of the overlay region of the panel on the live video interface may be referred to display on the interface 12 exemplarily illustrated in FIG. 2H.

The interface 12 may include a region 204.

The region 204 is used to exhibit the panel. Exemplarily, the display mode of the overlay region of the panel on the live video interface may be referred to display of the region 204 exhibited on the interface 12 exemplarily illustrated in FIG. 2H.

In another embodiment, the display mode of the overlay region of the panel on the live video interface may include displaying in an overlaying manner in a top region of the live video interface.

In still another embodiment, the display mode of the overlay region of the panel on the live video interface may include displaying in an overlaying manner in a bottom region of the live video interface.

In still another embodiment, the display mode of the display region of the panel on the live video interface may include displaying in an overlaying manner in a left region of the live video interface.

In still another embodiment, the display mode of the display region of the panel on the live video interface may include displaying in an overlaying manner in a right region of the live video interface.

It should be noted that in the case of displaying the material related to the target guide information in a highlighting manner on the live video interface, it is optional to display a pop-up window on the live video interface so that the material related to the target guide information is displayed in a form of one pop-up window; or it is optional to display a panel in an overlaying manner on the live video interface so that the material related to the target guide information is displayed in a form of a panel.

Selection of the display mode of the material related to the target guide information in a highlighting manner on the live video interface may be performed based on the target guide information.

Figure 2G:
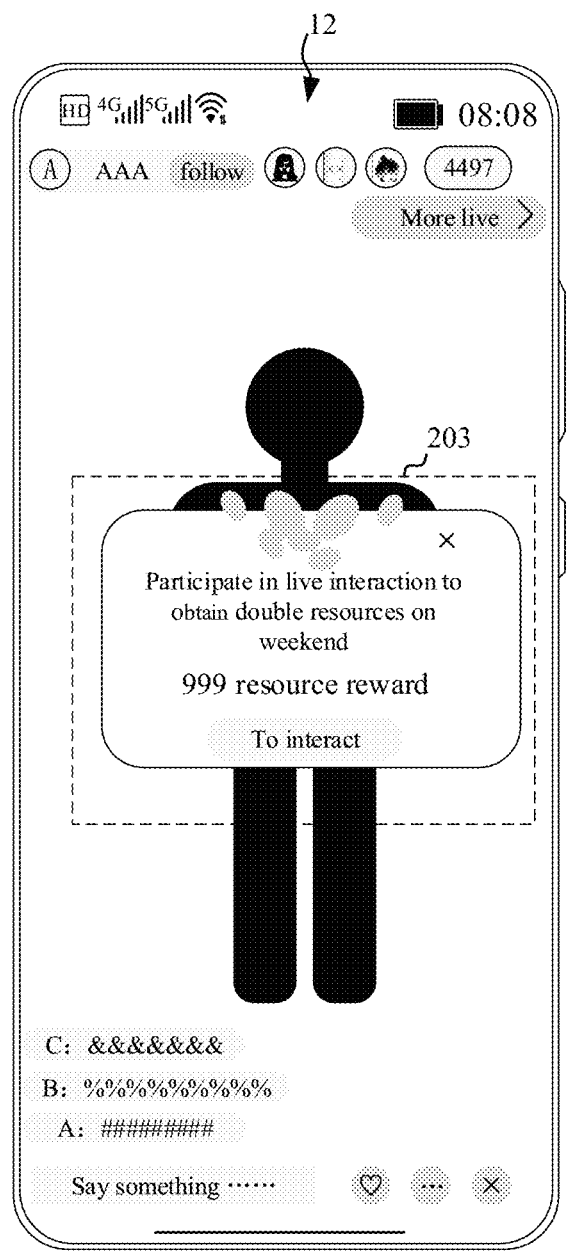
Figure 2H:
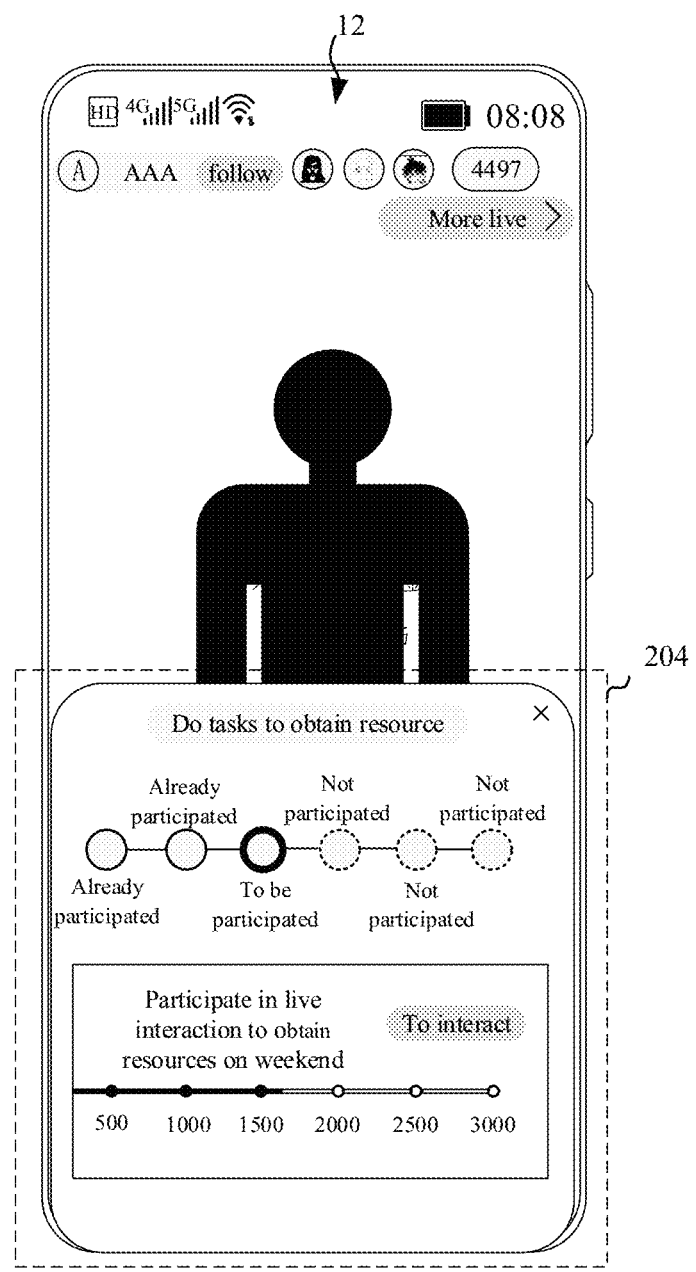

For example, if the target guide information is to display a material for a fabrication task, then the material related to the target guide information may be displayed in the form of a pop-up window, for example, as the display of relevant content in the region 203 exhibited on the interface 12 exemplarily illustrated in FIG. 2G. If the target guide information is to display materials for a plurality of fabrication tasks, then the materials related to the target guide information may be displayed in the form of overlay panels, for example, as the display of relevant content in the region 204 exhibited on the interface 12 exemplarily illustrated in FIG. 2H.

Thus, by formulating different exhibition rules, display templates of materials related to the target guide information in different forms are exhibited to the user, so that the user can have a clearer understanding of the materials related to the target guide information for performing a trigger operation, which implements effective interaction with the APP, and improves user stickiness.

In the interaction method provided by the embodiments of the present disclosure, the target guide information is displayed on the preview stream interface, to exhibit the target guide information of the live video to the user, so as to guide the user to enter the live video interface. In response to a trigger for the preview stream interface, the user enters the live video interface from the preview stream interface, the material related to the target guide information is displayed in a highlighting manner on the live video interface, so that the user can have a visual understanding of an intention to enter the live video room, and the material related to the target guide information is exhibited to the user, which facilitates the user to execute a relevant operation and improves watching willingness of the user.

Figure 3:
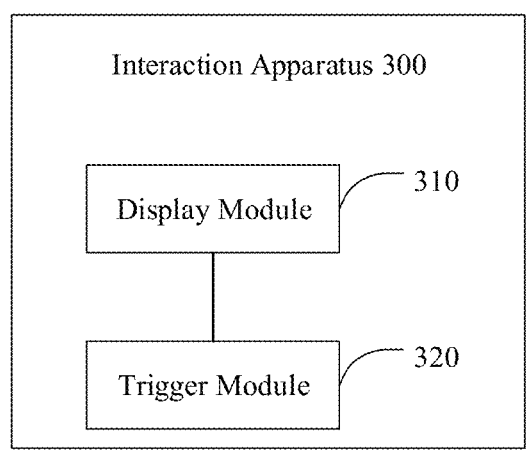
FIG. 3 is a structural schematic diagram of an interaction apparatus provided by an embodiment of the present disclosure.

FIG. 3 is a structural schematic diagram of an interaction apparatus provided by the present disclosure. As illustrated in FIG. 3, an interaction apparatus 300 provided by the embodiment includes: a display module 310 and a trigger module 320.

The display module 310 is configured to display target guide information on a preview stream interface.

The trigger module 320 is configured to, in response to a trigger for the preview stream interface, enter a live video interface, and display a material related to the target guide information in a highlighting manner on the live video interface.

In this embodiment, optionally, the preview stream interface alternately displays a plurality of pieces of guide information, and the target guide information is a piece of guide information displayed at a moment when a trigger occurs.

In this embodiment, optionally, the target guide information is interaction through a target prop.

Displaying the material related to the target guide information in the highlighting manner on the live video interface includes:

displaying the target prop in the highlighting manner in a third preset region on the live video interface.

In this embodiment, optionally, displaying the target prop in the highlighting manner in the third preset region on the live video interface includes:

zooming in the target prop with an animatic effect in the third preset region on the live video interface.

In this embodiment, optionally, displaying the material related to the target guide information in the highlighting manner on the live video interface includes:

displaying a pop-up window on the live video interface, and displaying the material related to the target guide information within the pop-up window.

In this embodiment, optionally, displaying the material related to the target guide information in the highlighting manner on the live video interface includes:

displaying a panel in an overlaying manner on the live video interface, and displaying the material related to the target guide information on the panel.

In this embodiment, optionally, the preview stream interface further displays a target icon corresponding to the target guide information.

The interaction apparatus provided by the present disclosure may execute the above-described method embodiments, the above-described method embodiments may be referred to for specific implementation principles and technical effects thereof, and no details will be repeated here.

Exemplarily, the present disclosure provides an electronic device, which includes: one or more processors; a memory; and one or more computer programs stored in the memory. The one or more processors, when executing the one or more computer programs, cause the electronic device to implement the interaction method according to the foregoing embodiments.

Exemplarily, the present disclosure provides a chip system, applied to an electronic device including a memory and a sensor. The chip system includes a processor, and the processor executes the interaction method according to the foregoing embodiments.

Exemplarily, the present disclosure provides a computer readable storage medium, having a computer program stored thereon. The computer program, when executed by a processor, causes an electronic device to implement the interaction method according to the foregoing embodiments.

Exemplarily, the present disclosure provides a computer program product. The computer program product, when running on a computer, causes the computer to execute the interaction method according to the foregoing embodiments.

The above-described embodiments may be implemented in whole or in part by software, hardware, firmware, or any combination thereof. When implemented by software, it may be implemented in a form of a computer program product in whole or in part. The computer program product includes one or more computer instructions. When the computer loads and executes the computer instructions, the flows or functions described in the embodiments of the present disclosure are executed in whole or in part. The computer may be a general-purpose computer, a special-purpose computer, a computer network, or other programmable apparatus. The computer instructions may be stored in a computer readable storage medium. The computer readable storage medium may be any available medium that can be accessed by a computer or a data storage device including a server, a data center, etc., integrated by one or more available media. The available medium may be a magnetic medium (e.g., a floppy disk, a hard disk, a magnetic tape); an optical medium (e.g., a digital video disc (DVD)); or a semiconductor medium (e.g., a solid state disk (SSD)).

It should be noted that, relational terms herein such as "first" and "second" are only used to distinguish one entity or operation from another entity or operation, and do not necessarily require or imply any actual relationship or order between these entities or operations. In addition, the terms "include", "comprise", or any other variants thereof are intended to cover a non-exclusive inclusion, so that a process, a method, a product or a device that includes a list of elements not only includes those elements but also includes other elements that are not expressly listed, or further includes elements inherent to such process, method, product or device. Without more constraints, the elements limited by the statement "including one . . . " does not exclude that there is another same or identical element in the process, method, product, or device that includes the element.

The above is only the specific implementations provided to enable those skilled in the art to understand and practice the present disclosure. Various modifications to these embodiments are readily apparent to those skilled in the art, and the generic principles defined herein may be applied to other embodiments without departing from the spirit or scope of the present disclosure. Therefore, the present disclosure is not limited to these embodiments described herein, but is to be accorded the widest scope consistent with the principles and novel features disclosed herein.

The invention claimed is:

1. An interaction method, comprising:

displaying a preview image of a live video on a preview interface, wherein the preview interface further displays a control, and a piece of resource guide information is displayed on the control, the resource guide information is used for guiding a user to obtain a resource; and in response to a trigger for the control, displaying a live video interface of the live video, and displaying a resource material related to the resource guide information in a highlighting manner on the live video interface, wherein the resource material is used for guiding the user to obtain the resource, wherein a plurality of pieces of guide information are dynamically displayed on the preview interface in an alternate display mode, the alternate display mode comprises flipping replacement display or tiling replacement display, and the resource guide information is a piece of guide information displayed at a moment when the trigger occurs.

2. The method according to claim 1, wherein displaying the resource material related to the resource guide information in the highlighting manner on the live video interface comprises:

displaying a first element in the highlighting manner in a third preset region on the live video interface.

3. The method according to claim 2, wherein displaying the first element in the highlighting manner in the third preset region on the live video interface comprises:

zooming in the first element with an animatic effect in the third preset region on the live video interface.

4. The method according to claim 1, wherein displaying the resource material related to the resource guide information in the highlighting manner on the live video interface comprises:

displaying a pop-up window on the live video interface, and displaying the resource material related to the resource guide information within the pop-up window.

5. The method according to claim 1, wherein displaying the resource material related to the resource guide information in the highlighting manner on the live video interface comprises:

displaying a panel in an overlaying manner on the live video interface, and displaying the resource material related to the resource guide information on the panel.

6. The method according to claim 1, wherein the preview interface further displays a second element corresponding to the resource guide information.

7. The method according to claim 4, wherein the pop-up window displays an interactive control corresponding to the resource guide information, the resource guide information indicates live interactive guidance information, the live interactive guidance information is used to guide the user to enter a live video channel and participate in live video channel interaction to obtain a target resource, and the method further comprises:

in response to triggering of the interactive control, displaying an interactive interface; and in response to completing target interaction through the interactive interface, obtaining the target resource.

8. The method according to claim 7, wherein, in response to the triggering of the interactive control, displaying the interactive interface, comprises:

in response to the triggering of the interactive control, displaying a gift interactive interface, wherein a plurality of gift identifications are displayed on the gift interactive interface; and in response to a gift sending operation corresponding to a target gift identification, sending a gift corresponding to the target gift identification to a host of the live video channel, wherein the target gift identification is one gift identification among the plurality of gift identifications.

9. The method according to claim 5, wherein the panel displays an interactive control corresponding to the resource guide information, the resource guide information indicates live interactive guidance information, the live interactive guidance information is used to guide the user to enter a live video channel and participate in live video channel interaction to obtain a target resource, and the method further comprises:

in response to triggering of the interactive control, displaying an interactive interface; and in response to completing target interaction through the interactive interface, obtaining the target resource.

10. The method according to claim 9, wherein, in response to the triggering of the interactive control, displaying the interactive interface, comprises:

in response to the triggering of the interactive control, displaying a gift interactive interface, wherein a plurality of gift identifications are displayed on the gift interactive interface; and in response to a gift sending operation corresponding to a target gift identification, sending a gift corresponding to the target gift identification to a host of the live video channel, wherein the target gift identification is one gift identification among the plurality of gift identifications.

11. An interaction apparatus, comprising:

a display module, configured to display a preview image of a live video on a preview interface, wherein the preview interface further displays a control, and a piece of resource guide information is displayed on the control, the resource guide information is used for guiding a user to obtain a resource; and a trigger module, configured to, in response to a trigger for the control, display a live video interface of the live video, and display a resource material related to the resource guide information in a highlighting manner on the live video interface, wherein the resource material is used for guiding the user to obtain the resource, wherein a plurality of pieces of guide information are dynamically displayed on the preview interface in an alternate display mode, the alternate display mode comprises flipping replacement display or tiling replacement display, and the resource guide information is a piece of guide information displayed at a moment when the trigger occurs.

12. The apparatus according to claim 11, wherein the resource guide information is interacted through a first element; and the trigger module is further configured to display the first element in the highlighting manner in a third preset region on the live video interface.

13. The apparatus according to claim 12, wherein the trigger module is further configured to zoom in the first element with an animatic effect in the third preset region on the live video interface.

14. The apparatus according to claim 11, wherein the trigger module is further configured to display a pop-up window on the live video interface and display the resource material related to the resource guide information within the pop-up window.

15. The apparatus according to claim 11, wherein the trigger module is further configured to display a panel in an overlaying manner on the live video interface and display the resource material related to resource guide information on the panel.

16. The apparatus according to claim 11, wherein the preview interface further displays a second element corresponding to the resource guide information.

17. An electronic device, comprising: one or more processors; a memory; and one or more computer programs stored in the memory, wherein the one or more processors, when executing the one or more computer programs, cause the electronic device to implement the interaction method according to claim 1.

18. A computer storage medium, comprising computer instructions, wherein the computer instructions, when running on an electronic device, cause the electronic device to execute the interaction method according to claim 1.

19. An electronic device, comprising: one or more processors; a memory; and one or more computer programs stored in the memory, wherein the one or more processors, when executing the one or more computer programs, cause the electronic device to implement the interaction method according to claim 2.

20. An electronic device, comprising: one or more processors; a memory; and one or more computer programs stored in the memory, wherein the one or more processors, when executing the one or more computer programs, cause the electronic device to implement the interaction method according to claim 3.

* * * * *